United States Patent [19]

Taylor

[11] 4,249,391

[45] Feb. 10, 1981

[54] COOLING TOWER VAPOR RECOVERY UNIT

[75] Inventor: Michael C. Taylor, Texas City, Tex.

[73] Assignee: Thomas Mackey, Texas City, Tex.; a part interest

[21] Appl. No.: 76,927

[22] Filed: Sep. 19, 1979

[51] Int. Cl.³ .............................................. F28D 5/00
[52] U.S. Cl. ...................................... 62/304; 62/272; 261/109; 261/160; 261/DIG. 11
[58] Field of Search ................. 62/93, 272, 304, 5; 261/109, 160, DIG. 11

[56] References Cited

U.S. PATENT DOCUMENTS

| 93,840 | 8/1869 | Schillinger | 261/160 |
|---|---|---|---|
| 960,417 | 7/1910 | Schwanhausser | 261/160 |
| 3,721,290 | 3/1973 | Butler, Jr. | 261/DIG. 11 |
| 3,818,718 | 6/1974 | Freese | 62/93 |

Primary Examiner—Ronald C. Capossela
Attorney, Agent, or Firm—Clarence A. O'Brien; Harvey B. Jacobson

[57] ABSTRACT

Water vapor released by evaporation in a cooling tower, is conducted through an enclosure to the upper inlet end of a vertical conduit extending into the body of water stored in the cooling tower. The water vapor downflowing through the vertical conduit under vacuum conditions is condensed by cooling sprays of water drawn by pumps from the bottom of the cooling tower.

10 Claims, 4 Drawing Figures

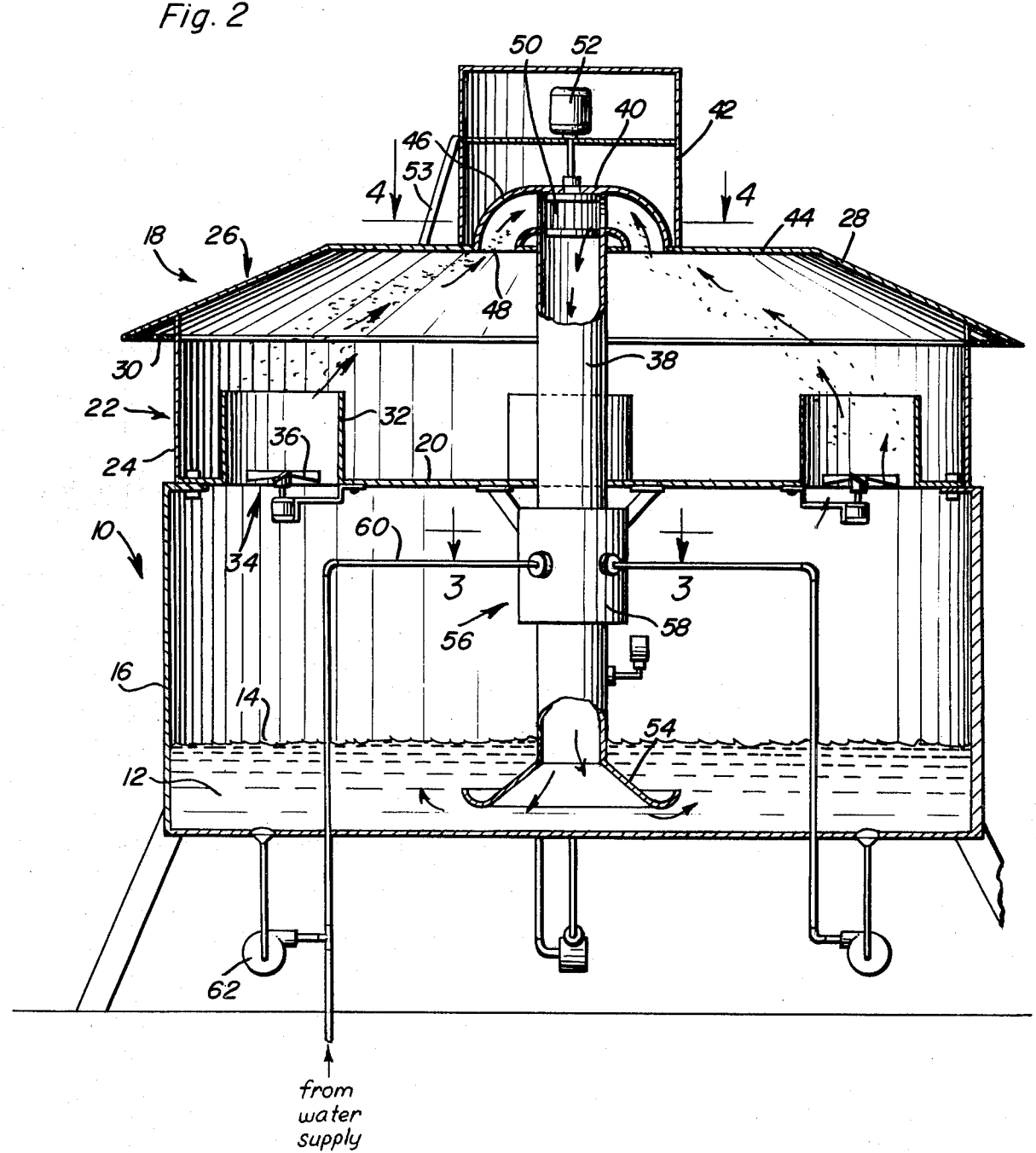

COOLING TOWER VAPOR RECOVERY UNIT

BACKGROUND OF THE INVENTION

This invention relates in general to improvements in the operation of water cooling towers and more particularly to a unit attached to a cooling tower for recovering water vapor ordinarily escaping to atmosphere.

Water cooling towers are commonly used for large waste heat producing installations such as building air conditioning systems, oil refineries, etc., in order to dissipate the heat to atmosphere. A large body of water is accordingly stored in the cooling tower within which the waste heat is absorbed, so that such heat may be dissipated by air cooling and evaporation. Such cooling processes involve the loss of a large amount of water and contributes to thermal air pollution.

It is therefore an important object of the present invention to provide a cooling tower through which waste heat is more efficiently dissipated with a minimal loss of water.

SUMMARY OF THE INVENTION

In accordance with the present invention, the top of a water cooling tower is closed by an enclosure through which thermal updrafts of water vapor laden air is conducted under the added inducement of blower fans. The air-vapor flow streams are conducted into the upper inlet end of a vertical conduit through which the air and vapor flows downwardly to a lower outlet end of the conduit submerged within the body of water stored in the cooling tower. A plurality of pumps connected to the bottom of the cooling tower draw the coolest water therefrom which is supplied to spray heads of a vapor condenser surrounding the vertical conduit just below the bottom wall of the enclosure at the top of the cooling tower. The vapor downflowing in the conduit is thereby cooled under vacuum conditions to form a condensate that is returned to the cooling tower.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a side section view through the installation shown in FIG. 1.

DETAILED DESCRIPTION OF PREFERRED EMBODIMENT

Figure 1:
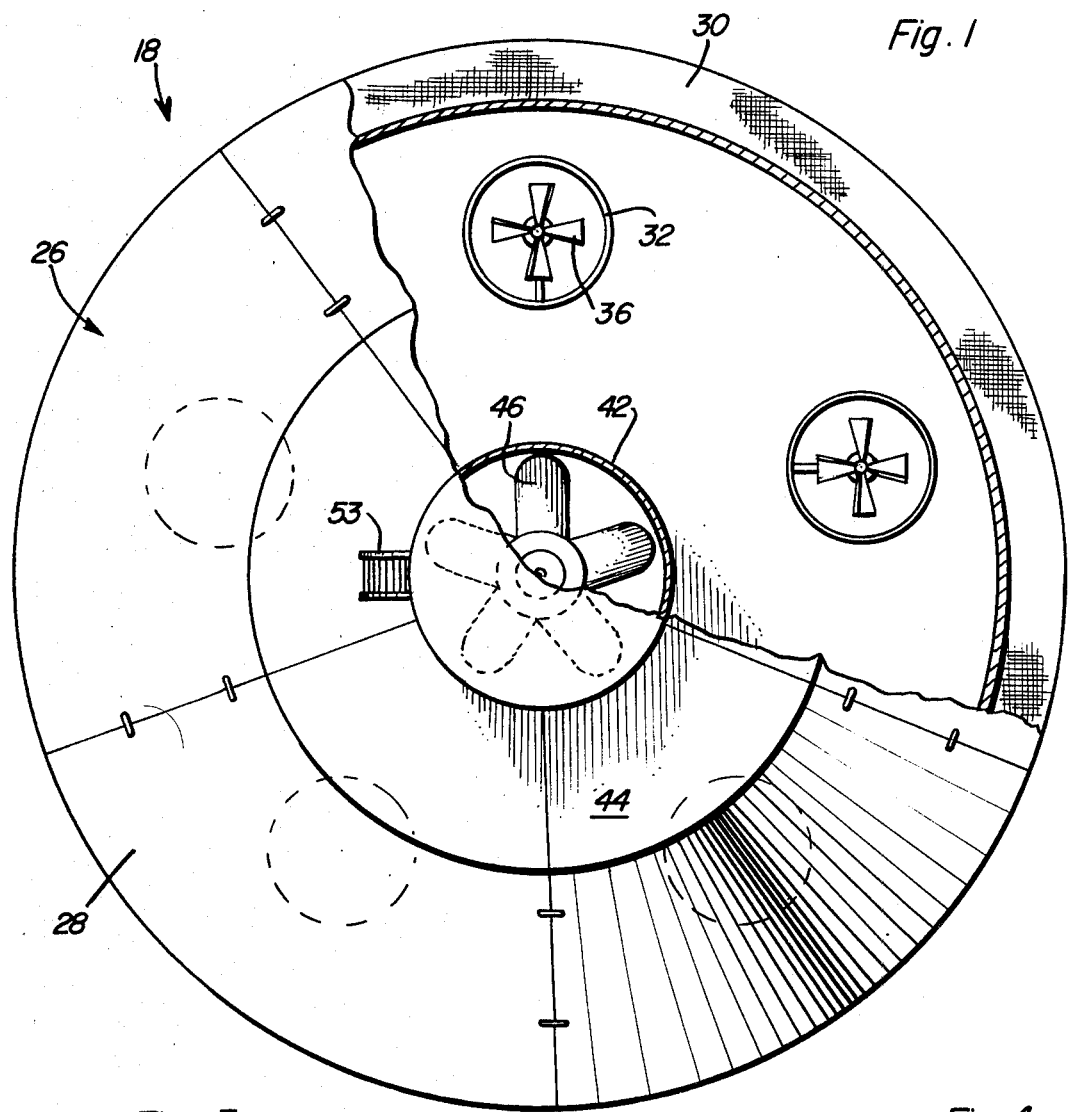
FIG. 1 is a top plan view, with parts broken away and shown in section, of a vapor recovery unit mounted on a cooling tower in accordance with the present invention.

Referring now to the drawings in details, FIGS. 1 and 2 illustrate a typical water cooling tower 10 within which a relatively large body of water 12 is stored at a predetermined level for dissipation of waste heat from the water by evaporation at the water surface 14 and by convection to the atmosphere from the walls 16 of the tower. Because of the heat in the water, a thermal updraft of air carrying the water vapor also accounts for removal of heat by air cooling to ordinarily increase the loss of water by evaporation. In accordance with the present invention, however, the escape of water vapor in any updraft of air is minimized by the mounting of a water recovery unit 18 on top of the cooling tower.

The unit 18 closes the open upper end of the cooling tower by means of a bottom cover wall 20 forming part of a sectional sheet metal enclosure 22 having an annular side wall 24 secured to the bottom wall and an upwardly convergent roof assembly 26 made of interconnected, removal sections 28. The roof assembly overhangs the side wall to form an annular, screened vent opening 30.

A plurality of spaced chimney sections 32 project upwardly into the enclosure 22 at openings 34 in the bottom wall 20 through which a thermal updraft of air with water vapor entrained therein is conducted. The updraft flow streams in the chimney section 32 are augmented by motor driven axial blower fans 36 mounted in the updraft openings 34. Thus, the enclosure receives an accelerated inflow of air and water vapor to enhance the air cooling and evaporation processes which ordinarily effect removal of heat from the water 12 in the cooling tower.

A vertically elongated conduit 38 as more clearly seen in FIG. 2, is centrally fixed to the enclosure 22 and extends upwardly to inlet end portion 40 enclosed within a housing 42 secured to the top flat surface 44 of the roof assembly. A plurality of curved inlet tube sections 46 interconnect the inlet end portion with outlet openings 48 in the top 44 of the roof assembly through which air laden with water vapor escapes from the enclosure. A squirrel cage type of blower rotor 50 is mounted within the inlet end portion of the conduit 38 to produce a suction pressure causing an accelerated inflow of air and water vapor from the enclosure for down-flow through the conduit. A blower motor 52 supported in the housing 42 is connected to the blower rotor 50. Access to the motor for servicing and repair purposes may be provided by means of a ladder 53. The conduit 38 extends below the bottom wall into the cooling tower and terminates at an outwardly flaring lower end portion 54 submerged within the body of water 12 below the water surface level. During its descent, the water vapor is condensed into liquid water by the cooling action of a vapor condensing facility generally referred to by reference numeral 56.

Figure 3:
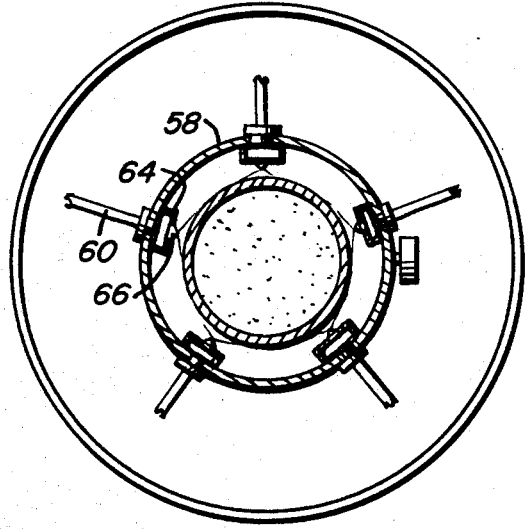
FIG. 3 is a partial section view taken substantially through a plane indicated by section line 3—3 in FIG. 2.
Figure 4:
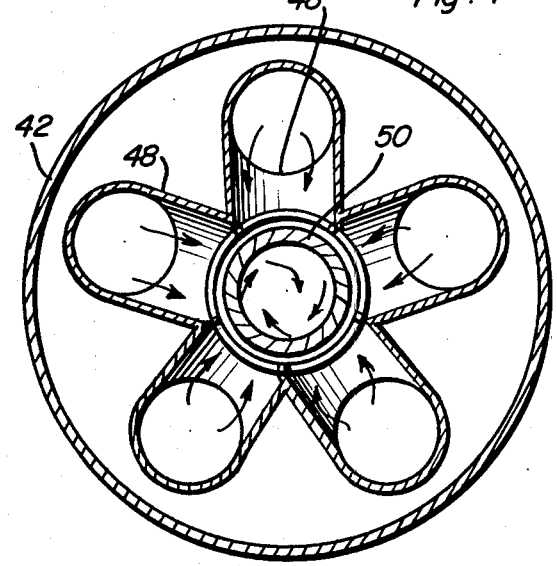
FIG. 4 is a partial sectional view taken substantially through a plane indicated by section line 4—4 in FIG. 2.

The vapor condenser 56 is mounted below the bottom wall 20 of the enclosure 22 in surrounding relation to the conduit 38 and includes an annular shield 58 to which a plurality water supply conduits 60 are connected. The supply conduits 60 extend from the water supply for the cooling tower and the outlets of a plurality of pumps 62 including the regular water cooling pumps having their intakes connected to the bottom of the water cooling tower 10. Accordingly, the coolest portion of the water 12 is conducted under pressure through the conduits 60 to a plurality of mainfolds 64 supported internally on the shield 58 as shown in FIG. 3. Vertically spaced spray heads 66 on the mainfolds discharge sprays of water onto the conduit 38 for cooling thereof causing condensation of the water vapor under the vacuum conditions established in the conduit 38 by the suction of the pumps 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use with a water cooling tower within which water is stored at a predetermined level, a vapor recovery unit comprising an enclosure mounted on the cooling tower blocking escape of vapor to atmosphere, an elongated, vertical conduit extending from the enclosure into the cooling tower below said level of the water therein, means inducing an accelerated flow of water vapor from the cooling tower through said enclosure into the conduit for downflow of the vapor, and condensing means for cooling the downflowing vapor in the conduit to discharge a water condensate into the cooling tower below said level of the water therein.

2. The vapor recovery unit as defined in claim 1, wherein said enclosure includes a bottom wall closing an upper end of the cooling tower and having a plurality of updraft openings therein, side walls connected to the bottom wall and an upwardly convergent roof connected to the side walls, said vertical conduit having an upper inlet end portion projecting above the roof and enclosing the flow inducing means therein.

3. The vapor recovery unit as defined, in claim 2, wherein said condensing means includes a manifold mounted adjacent the vertical conduit above said level of water in the cooling tower, a plurality of spray heads mounted on the mainfold, and pump means for supplying pressurized water from the cooling tower to the mainfold causing discharge of the water from the spray heads onto the conduit.

4. The vapor recovery unit as defined in claim 3, wherein said flow inducing means includes blower means mounted in said updraft openings of the bottom wall for producing a stream of water vapor laden air, and outlet passage means connected to the roof section for conducting said stream into the inlet end portion of the vertical conduit.

5. The vapor recovery unit as defined in claim 2, wherein said flow inducing means includes blower means mounted in said updraft openings of the bottom wall for producing a stream of water vapor laden air, and outlet passage means connected to the roof section for conducting said stream into the inlet end portion of the vertical conduit.

6. The vapor recovery unit as defined in claim 1, wherein said condensing means includes a mainfold mounted adjacent the vertical conduit above said level of water, a plurality of spray heads mounted on the mainfold, and pump means for supplying pressurized water from the cooling tower to the mainfold causing discharge of the water from the spray heads onto the conduit.

7. Apparatus for recycling water lost by evaporation from a cooling tower, comprising a cover wall limiting escape of water vapor from the cooling tower to at least one updraft opening, a vertically elongated conduit extending through the cover wall into a body of water within the tower, said conduit having an upper inlet end and a lower outlet end submerged within said body of water, flow inducing means for conducting water vapor from the updraft opening to said inlet end of the conduit, and means cooling the conduit below the cover wall for condensing water vapor in the conduit downflowing from the inlet end toward the outlet end.

8. The apparatus as defined in claim 7, wherein said flow inducing means comprises a blower device mounted in said upper inlet end of the conduit.

9. The apparatus as defined in claim 8, wherein said cooling means includes a manifold, a plurality of spray heads mounted on said manifold, and pump means for inducing flow of water from the cooling tower to the manifold to cause discharge of the water from the spray heads onto the conduit.

10. The apparatus as defined in claim 7, wherein said cooling means includes a manifold, a plurality of spray heads mounted on said manifold and pump means for inducing flow of water from the cooling tower to the manifold to cause discharge of the water from the spray heads onto the conduit.

* * * * *